June 4, 1963  B. G. SMITH  3,092,489
PROCESS FOR PRODUCTION OF FERTILIZER PELLETS AND THE LIKE
Filed Feb. 23, 1960

INVENTOR.
BENJAMIN G. SMITH,
BY
ATTORNEYS.

United States Patent Office 3,092,489
Patented June 4, 1963

3,092,489
PROCESS FOR PRODUCTION OF FERTILIZER PELLETS AND THE LIKE
Benjamin G. Smith, Cincinnati, Ohio, assignor to The Chemical and Industrial Corp., Cincinnati, Ohio, a corporation of Ohio
Filed Feb. 23, 1960, Ser. No. 10,366
5 Claims. (Cl. 71—64)

This is a continuation-in-part of my copending application of the same title, Ser. No. 527,203, filed August 9, 1955, now Patent No. 2,926,079.

The present invention relates to a novel process for the formation of pellets of normally solid, water and soluble substances such as but not limited to fertilizers, fertilizer substances and the like.

Objects and advantages of the invention will be set forth in part hereinafter and in part will be obvious herefrom, or may be learned by practice with the invention, the same being realized and attained by means of the processes and steps pointed out in the appended claims.

The invention consists in the novel processes and steps herein shown and described.

An object of my invention is to provide a novel granulation process capable of producing fertilizer pellets of a more uniform size than the pellets formed by the presently known processes.

A further object of my invention is to provide a novel granulation process capable of producing uniform fertilizer pellets of a broader size range than is presently produced by the conventional granulation processes.

Another object of my invention is to provide a novel granulation process for the production of fertilizer pellets wherein a high degree of control over granulating conditions is maintained during the formation of said pellets.

A still further object of my invention is to provide a novel granulation process for the production of fertilizer pellets which is continuous and free of stoppage and losses of production due to mud formation.

Another object of my invention is to provide a novel granulation process for the production of fertilizer pellets which is more efficient, economical and simpler than present-day processes.

A still further object of my invention is to provide a novel granulation process wherein a substantial portion of the solid substances to be granulated is fed to the granulator in the form of a slurry or solution.

In the presently used processes for the formation of fertilizer pellets, the pellets are formed by "agglomeration" methods. In the agglomeration methods, dry pulverulent material, usually smaller than 20 mesh in size, is wetted with a wetting fluid and rolled, shaken or agitated until the particles approach the plastic state, termed the "agglomerating point." At this point the particles begin to agglomerate or adhere to form granules comprising several particles.

Difficulties arise in connection with the above-described process which prevent the formation of pellets of uniform size as well as other undesirable results. First of all, the size of the pulverulent fertilizer material, of 20 mesh or less, makes a uniform transfer of the wetting fluid difficult if not impossible. Drops of moisture falling into a mass of this dry pulverulent material tend to roll up into balls of varying sizes rather than to disperse throughout the bed of material. This difficulty in uniformly wetting material of this size results in the formation of a wide range of granule sizes, including much oversized and undersized material. Also, there is a marked tendency during the wetting of this fine pulverulent material for the material to adhere to solid surfaces such as the granulator walls.

Another disadvantage of the foregoing agglomeration method is the difficulty of maintaining the proper moisture content during the formation of the granules. If the moisture content is too low so that the particles are insufficiently plasticized, ineffective agglomeration occurs. On the other hand, if the moisture content is too high the particles approach a mudding state or completely coalesce into a mud, causing stoppages and losses in production. For example, an increase in moisture of about 1% over the required agglomeration moisture content will turn the mixture into a mud.

A principal difficulty with agglomeration processes arises over the fact that many substances which are desired in pelletized form are initially manufactured by a chemical reaction (or recovered from a material containing them) in the form of a water solution or slurry. Such a solution or slurry, of course, cannot be directly pelletized. Instead, solid material in pulverulent form is introduced into a granulator; and while the solid material may be wetted with the solution or slurry instead of with water to raise its moisture content to the agglomeration point, the amount of slurry which can be so added is strictly limited, as will be clear from what has been said above. The final pellets will be made up preponderantly from the solid pulverulent substance. This requires a large and continuous supply of the finely divided solids.

It is possible to dry a solution or slurry to recover the solids in it and then grind these solids to about 20 mesh; but this is generally prohibitively expensive. In most agglomeration processes, the continuous supply of finely divided solids is provided by recycling ground, previously pelletized materials. The undersized and oversized materials in the granulator output are not sufficient to provide the supply, so that large quantities of pellets which could otherwise be sold must be ground and sent back to the granulator. Frequently as much as 8 to 10 pounds must be recycled for each pound of finished product, making the process slow, and high in cost, and requiring the expensive provision of a greatly oversized plant.

It is a fundamental object of the invention to provide a method whereby pellets may be made consisting preponderantly of solids derived from a solution or slurry. In the description and claims which follow, the term "slurry" will be used to denote a water-vehicle, pumpable substance containing solids which are to be pelletized, whether said solids are dissolved or suspended, or both.

My novel process overcomes the disadvantages of the prior art processes and provides a method for forming uniform pellets over a relatively broad size range, generally in the range of about .03 inch to about 1.5 inches in diameter and preferably from about 0.03 to 0.25 inch in diameter, with the most preferred commercial pellets being between 0.065 and 0.185 inch in diameter.

In my copending application referred to above, I have claimed a procedure in which nuclei of the substance to be pelletized, having a moisture content below the agglomeration point, are separated by agitation in a chamber and intermingled with hot drying gases passing through the chamber. While so separated (generally in a free falling condition) the nuclei are coated with fine droplets of slurry introduced usually by spraying the slurry into the hot drying gases. Although the moisture content of the nuclei may in this way be raised temporarily above the agglomeration point, the action of the gases is to dry the imposed slurry droplets substantially instantaneously so that the coated nuclei have their moisture content again reduced to below the agglomeration point before they can come together or contact uncoated nuclei under agglomerating conditions. Thus by coating and recoating nuclei, pellets are produced made up primarily from solids derived from the slurry, which pellets are rounded, smooth and remarkably uniform size. It is an advantage of that process that, where desired, spray-dried droplets of slurry, dried in the chamber without coming into contact with the separated nuclei, serve to furnish, in part at least, a continuous supply of fresh nuclei.

The process of the present application is based upon the fact that, while for agglomeration a mass or bed of nuclei must attain a critical moisture content as hereinafter set forth, actual agglomeration takes a certain amount of time. The surfaces of the nuclei must either be softened sufficiently to enable them to adhere together, or the slurry applied must attain a sticky or tenacious quality, or both, and these actions do not occur instantaneously. It becomes possible, therefore, to apply slurry to a portion of a mass or bed of nuclei so as to wet them to or above the agglomeration point, and by the application of immediate agitation to separate the coated nuclei and intermingle them with hot drying gases which will dry them to below the agglomeration point before they come together again. This is because until actual agglomeration starts, there is only a minimum of force holding the nuclei together. The amount of slurry added is not limited to the critical agglomeration quantity, but may considerably exceed this.

The result is similar to that of the process claimed in the said copending application, with these exceptions: the separation of nuclei may not be so perfect, so that a number of the pellets may contain two or more nuclei. The pellets may thus be formed to size at a somewhat faster rate; and their formation may require a somewhat larger percentage of initially solid material. Some of the pellets may lack the complete surface smoothness which generally characterizes nuclei which are coated in the completely separated condition. But the nuclei are still remarkably uniform in size, are made up principally of solids derived from the slurry, and are firm and strong. The procedure involves very nearly the same economy and commercial advantages as compared with conventional agglomeration processes.

Moreover, the procedure of this application may be combined with the procedure of the said copending application both as to the coating of nuclei while in separated condition, and as to the formation of nuclei by spray drying.

The term "nuclei" as used herein will now be defined so that my present process is clearly described. The term "nuclei" relates to the particles which are adapted to be coated with additional material in forming the desired pellets. Hence, the term "nuclei" as used herein relates to those particles which are the embryos for the final fertilizer pellets. It is not necessary, however, that the nuclei be of the same substance as the solids in the slurry since it is readily possible in my process to produce pellets consisting of two or more substances. By way of a single example it is possible to form pellets of ammonium nitrate on a base of limestone nuclei.

The size of my nuclei is such that they will tend to disseminate moisture before agglomeration occurs, the size of said nuclei being larger than the dry pulverulent particles used in the conventional agglomeration process. Accordingly, my nuclei are generally larger than 20 mesh to 30 mesh and always larger than 40 mesh. Advantageously, a mass of my nuclei when wetted with excess fluid will rapidly transfer and disseminate the extra moisture throughout a substantial volume, and only hang together very loosely by the surface tension of the fluid at the outset.

With smaller particles, such as used in the prior processes, the wetting brings these tiny particles into sufficiently close contact that the mass tends almost immediately to roll up into granules much larger than the constituent particles.

It should be understood that a small percent of particles smaller than the required nuclei size may be present in the granulator, these particles usually being pulverized material cycled back for reprocessing. These tiny recycled particles are not in themselves nuclei as defined herein, but may be employed in the formation of nuclei by wetting these particles in a manner described hereinbelow.

The nuclei to be used in accordance with my process may be obtained by many different methods. If so desired, particles of the desired chemical composition and size produced independent of the present process may be used. Preferably, however, the nuclei are produced by the utilization of a portion of the slurry to be later used in the coating operation. Accordingly, a portion of the slurry containing solids may be passed to the granulator and dried within the granulator, resulting in the formation of the desired nuclei on evaporation of the liquid or solvent. Also, as mentioned hereinabove, dry pulverized material, usually recycled material, may be passed to the granulator and wetted to form the nuclei by incipient granulation.

It is necessary in the practice of the invention that the bed of nuclei in the granulator be kept generally below the moisture content required for agglomeration, localized portions of the bed only being brought to a moisture content above the agglomeration point. The granulator is preferably a kiln-like cylindrical vessel mounted so that its axis is nearly horizontal, and arranged to be driven about its axis. It has longitudinal vanes on its interior so that during rotation these vanes pick up masses of the nuclei, carry them upwardly, and drop them back to the bottom of the granulator, thus effecting agitation, the degree of which will depend upon the speed of rotation. The term "bed" as used in this application is intended to refer to masses of nuclei lying substantially in contact with each other in the bottom of the granulator and as carried upwardly by the vanes until such time as the vanes release them to fall to the bottom of the granulator again.

If the bed were uniformly wetted to the agglomeration point it would be impossible to avoid the conventional agglomerating action since one would not be able to subject all parts of the bed simultaneously to the necessary agitation for the separation of coated nuclei. But if the bed is generally maintained well below an agglomerating moisture content, it is readily possible to wet some localized portion of it, say a surface portion, and then immediately subject this portion to agitation such as will serve the purposes of this invention.

At the beginning of the operation of the granulator, it is advisable to place within the granulator material of good nuclei size in order to start the process. After this, however, the recycle material fed to the granulator is generally not of nuclei size as used herein. Generally, this material forms nuclei particles by incipient agglomeration, although a small portion of the recycle material may be of sufficient size to act as nuclei. It is believed that this "incipient agglomeration" comes about because fines, by which is meant a solid material substantially smaller in size than the nuclei, tend to agglomerate more readily and more rapidly than do larger particles. Thus if a localized portion of a mass of nuclei containing fines is wet with slurry, the fines tend to stick to each other or to nuclei substantially at once, and further, a degree of agitation satisfactory for the separation of coated nuclei has little tendency to individualize the fines. The presence of a minor percentage of fines is therefore a self-correcting condition; and it is an advantage of this process that a lesser quantity of fines will be blown out the stack despite a rapid passage of the hot drying gases through the chamber.

The process will be described in connection with the pelletizing of fertilizer, it being understood that this constitues no limitation on the invention. The nuclei bed comprising nuclei particles is subjected to agitation and locally wetted with the slurry containing fertilizer material. This slurry preferably contains a substantial portion of the solid fertilizer raw materials which are subsequently coated on the nuclei particles. Thus, a substantial portion of the fertilizer raw material, and preferably the greater part of it, is introduced in the slurry with the remaining portion of the final fertilizer pellet being the fertilizer substance forming the nuclei. Hence, the present process is different from the prior processes, wherein the fertilizer solids are directly granulated by the addition of a few percents of moisture (5–15%). By incorporating a substantial amount of the raw fertilizer material in the form of a slurry and subsequently coating the raw materials on the fertilizer nuclei, process control and product quality have been found to be sufficiently benefited to more than compensate for any increased drying cost derived from the formation of the raw material into a slurry.

The slurry is preferably sprayed on the nuclei bed to give a uniform wetting of the particles. Any fertilizer formulation that can be made into a pumpable slurry can be satisfactorily granulated in my process. The temperature of the slurry is not critical and is controlled only to provide a slurry of satisfactory pumping characteristics.

I have found that a most important factor in obtaining uniform pellets is that the moisture content of the granulating bed be generally or as a whole below that critical moisture at which agglomeration occurs. By "moisture content of the granulating bed" is meant the percentage of fluid phase present in the wetted bed, whether or not the moisture comes from the slurry applied to the nuclei bed or the moisture that may be derived from the nuclei itself. In other words, it is the liquid and the dissolved solids and not just the moisture present in the slurry added. For instance, in the granulation of a fertilizer consisting of 40% ammonium nitrate, 23% potassium chloride and 37% limestone, the percentage of water is only 4% at the agglomerating point, whereas the percentage of fluid phase is 20%. This difference is due to the solution of soluble salts within the water to increase the weight of fluid, decrease the weight of solid, and so increase the percentage of fluid phase in the mixture that is termed the moisture of the granulating bed.

The addition of slurry to the bed of solids in the granulator and the simultaneous evaporation of liquid define a certain moisture content of the granulating bed. As mentioned hereinabove, there is a maximum bed moisture above which agglomeration occurs, giving oversized particles. Thus, the moisture content must be low enough that particle build-up is formed not by agglomeration but by the formation of coatings on the wetted particles by the evaporation of the solvent of the slurry applied to the particles.

It will be well understood by those skilled in the field that the critical moisture content for different fertilizers and other substances will vary depending upon the chemical composition thereof. The moisture content necessary to produce agglomeration for any particular fertilizer can be accurately ascertained in the laboratory and is referred to as "agglomerating moisture."

One method for determining the agglomeration point is as follows:

To each of 6 samples in 100 ml. Erlenmeyer flasks consisting of 40 grams each of the material whose agglomeration point is to be determined, add water accurately from a burette so as to form a series of samples of moisture contents in the vicinity of the agglomeration point, and different by ½ percent of moisture. Seal the mouth of each flask with a close fitting rubber stopper and shake violently for four minutes with intermittent tapping on the table to loosen adhering solids. Pour the samples into separate watch glasses, and arrange in order of ascending moisture content. If the agglomeration moisture has been included in the samples, there will be a marked change in the appearance of the material with this moisture content. At this moisture, material will have rolled into glistening round balls of 10 mesh and greater in diameter, and all the samples of greater moisture content will either be muddy or contain larger more plastic granules. This experiment may be performed at any temperature desired so as to determine the agglomeration point of the material at elevated temperatures as well as room temperature.

In applying the present invention to a particular fertilizer, therefore, the moisture of the granulating bed of said fertilizer should be below the "agglomeration moisture" for that fertilizer. Only when the bed moisture approaches the agglomerating point does it become critical. It follows that an important element in my process is the control of the moisture content in the granulating bed so that it does not reach the agglomerating point throughout.

The operation in accordance with the present invention, as it occurs in the granulating drum or chamber, will now be described. As has been indicated, the bed of nuclei as a whole is below the agglomerating moisture content and hence is in a pulverulent condition. The drum is rotating so as to produce the agitation to be described. Hot drying gases, as hereinafter more particularly set forth are continuously passed through the drum.

The slurry, in appropriate amounts, is introduced into the drum so as to be distributed on the bed in such a way as to wet it locally. This may be done by spraying the slurry on the bed in the lower portion of the drum; but other methods of distribution are possible. It is not necessary that the slurry as introduced be in the form of fine droplets. Any method of distribution or introduction may be adopted, even to the delivery of the slurry onto the bed in the form of a stream. By wetting the bed locally is meant wetting less than the total volume of the bed at the situs of slurry delivery. Generally a surface portion only of the bed is wetted, leaving between the wetted portion and the walls of the drum a substantial layer of nuclei the moisture content of which is below the agglomeration point.

Immediately upon the localized wetting of the bed, the portion so wetted and adjacent unwetted portions of the bed are subjected to the agitation aforesaid, and in particular are lifted by the vanes of the drum and discharged at points adjacent the top of the drum, where they fall downwardly through the hot drying gases. The dryer portions of the bed prevent any clinging of the wetted portions to the walls of the drum; and since the action being described occurs prior to the time agglomeration starts, the result of the action is a showering of the bed in particulate form through the hot gases. The nuclei in the wetted portion, being as yet held together under no great force, tend to become separated during this showering action so as either to be individualized in coated condition or to be formed into groups of no more than about two or three nuclei also in coated condition.

During the drying, while the material is being showered through the hot gases, any coated nuclei or groups of nuclei are immediately dried so that by the time they again reach the lower portion of the drum they no longer have a moisture content above the agglomeration point or are in a non-agglomerating condition. At the same time nuclei of the bed, not in the originally wetted portion, are further dried. Hence the moisture content of the bed as a whole is maintained at below the agglomeration point, and there is no tendency for nuclei not directly wetted by the distributed slurry to accumulate moisture by absorption from wetted areas in such a way as eventually to attain an agglomerating moisture content.

The action described is continuous and repetitive, so that coated nuclei and groups are recoated until they attain the desired pellet size. In this connection it may be noted that, since some particles may contain two or three nuclei, the larger the particles become the greater is their tendency to separate from other particles during the showering action. Hence the product of the process is characterized by remarkable uniformity of pellet size.

The action is at all times under the control of the operator since he can vary the speed of rotation of the drum and the resultant degree of agitation; and he can vary the quantity of the introduced slurry. This makes possible continuous operation under non-agglomerating conditions, and the production of pellets in which the greater part of the solids are derived from the slurry, the pellets having the characteristics of pellets formed essentially by coating as distinguished from agglomeration.

It does not depart from the spirit of the invention to spray additional quantities of slurry into the hot drying gases so as to coat or recoat the nuclei, so long as the nuclei are dried by the gases before they can come together under conditions which otherwise would permit agglomeration. Also, since hot drying gases are being passed through the drum, slurry may be sprayed therein so as to produce spray dried droplets capable of acting as nuclei.

These various actions may be caused to take place in the same or in different sections of the drum. For example, pellets may be formed as herein taught, and then given a coating while in separated condition in accordance with the teachings of the said copending application to increase their surface smoothness and luster.

Generally, the hot gas temperatures are those which would be used in the normal operation of a rotary drier for drying fertilizer material which has been pelletized by agglomeration. Of course, the particular temperature of a drying gas or gases will vary depending upon the temperature needed to maintain the moisture content of the nuclei bed below the agglomeration point, and must not be so high as to produce decomposition in the material. I have found the regulation gas temperature to be generally in the range of 250° F.–1000° F.

The temperature of the nuclei bed is a function of the wetness or percentage of fluid phase present in the bed. For satisfactory operation of the granulator, it should be between the wet-bulb temperature of the exit gases and about 50 degrees above the maximum boiling point of the liquid in the slurry. Generally, the temperature of the bed material within the granulator varies from 150° to 260° F. Since this temperature is a function of the wetness or percentage of fluid phase present in the bed, it is useful in indicating when the fluid phase percentage reaches its critical or agglomeration moisture content. Operation at bed temperatures below about 140° F. results in excess wetting of the mass and loss of control. It is not the low temperature that causes such difficulty, but rather the excess of bed wetness which is measured by the bed temperature.

I have found that the range of moisture content of the slurry may vary insofar as pellet formation is concerned. It is necessary for the slurry to contain sufficient moisture for adequate pumpability. Amounts higher than this may be used but would result in higher drying costs, since on the addition of moisture to the bed of solids in the granulator, sufficient heat must be produced by the hot drying gases that there is a simultaneous evaporation of a sufficient amount of moisture in the slurry that the moisture content of the bed does not reach the agglomeration point.

It should be further realized that the quality of granules produced varies depending on such conditions as the variation of rate of slurry addition to each section of the granulator, variation of inlet gas temperature, variation of inlet gas flow, variation of recycle rate, spray drying of slurry within the granulator and control of initial wetting process.

Pellets produced in accordance with my invention have varied from 1.5 to 0.03 inch. Pellets of even larger size may be produced if so desired, as there is no problem in producing pellets larger than 1.5 inches in diameter. With respect to pellets less than 0.03 inch in diameter, a problem does arise, however, due to the small size of the nuclei used in forming the pellets and in particular to the uniform wetting of said nuclei, for reasons already described in detail hereinbefore.

The present process may be used in producing fertilizer pellets of any desired chemical compositions. As is well known to those skilled in the field, a fertilizer is commonly designated by a three number system, such as 3–9–6, those digits representing respectively the percentage of nitrogen, phosphorus as percent phosphorus pentoxide and potassium as percent potash, present in the fertilizer. Thus, a 3–9–6 fertilizer represents a fertilizer containing 3% nitrogen, 9% phosphorus pentoxide (generally termed phosphate) and 6% potash. Examples of typical fertilizer compositions useful in the present process are given below, with the parts by weight of the ingredients used in producing the fertilizer being shown.

EXAMPLE 1

*14–0–14 Grade*

452 lbs. potassium chloride
800 lbs. ammonium nitrate
748 lbs. dolomitic lime

EXAMPLE 2

*14–0–14 Grade*

452 lbs. potassium chloride
1287 lbs. ammonium sulfate
261 lbs. dolomitic lime

EXAMPLE 3

*14–0–14 Grade*

452 lbs. potassium chloride
609 lbs. urea
939 lbs. ground gypsum

EXAMPLE 4

*20–0–20 Grade*

645 lbs. potassium chloride
1143 lbs. ammonium nitrate
212 lbs. dolomitic limestone

EXAMPLE 5

*10–10–10 Grade*

323 lbs. potassium chloride
1010 lbs. superphosphate
67 lbs. ammonia
143 lbs. ammonium nitrate
437 lbs. ammonium sulfate
20 lbs. dolomitic limestone

EXAMPLE 6

*5–10–5 Grade*

162 lbs. potassium chloride
1010 lbs. superphosphate
33 lbs. ammonia
72 lbs. ammonium nitrate
218 lbs. ammonium sulfate
505 lbs. dolomitic limestone

EXAMPLE 7

*8–0–24 Grade*

216 lbs. potassium chloride
457 lbs. ammonium nitrate
679 lbs. potassium sulfate
648 lbs. dolomitic limestone As shown by the foregoing examples, a particular grade fertilizer may be made from different formulas, as illustrated by the above 14–0–14 grade of fertilizer obtained in Examples 1, 2 and 3, each of the formulas in said examples being of a different chemical composition. Also, the agglomeration points for each formula will also be different.

In below Table I there is shown agglomeration points for a number of the fertilizers of the foregoing examples, said agglomeration points having been determined by the method described in detail hereinbefore.

TABLE I

| Formula No. | Fertilizer Grade | Granulating point in % water |
|---|---|---|
| VI | 5-10-5 | 11.3% at 70° F. |
| V | 10-10-10 | 9.2% at 70° F. |
| X | 14-0-14 | 5.6% at 70° F. |
| VI | 20-0-20 | 5.2% at 60° F. |
| VII | 9-0-24 | 8.0% at 70° F. |

In order to describe my process even further, reference is now made to the accompanying drawings.

Figure 1:
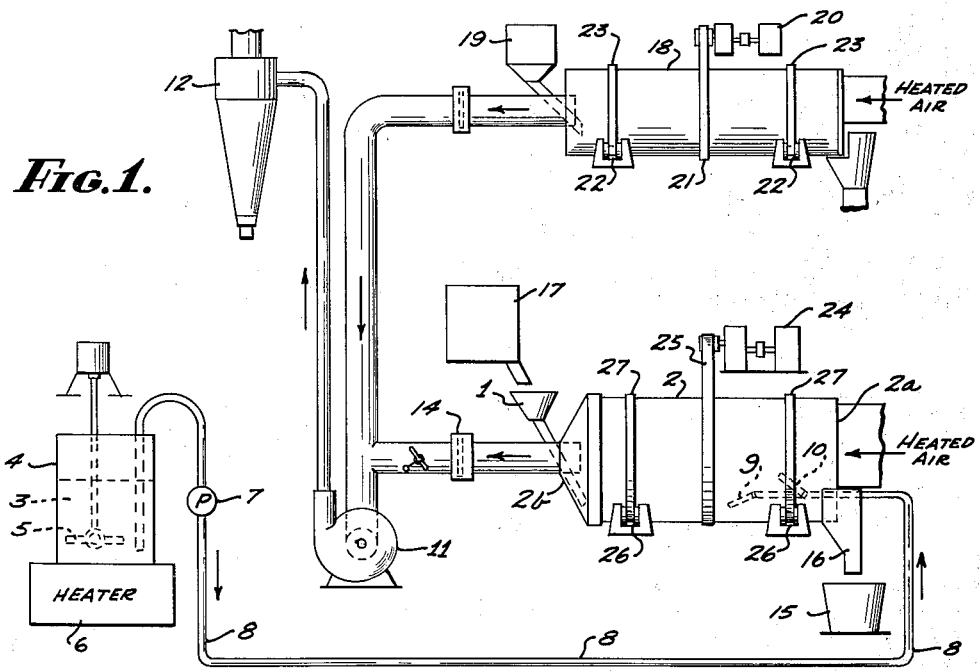
FIG. 1 represents a diagrammatic view of one arrangement for carrying out the process described herein.

Referring to the drawings, solid feed consisting of recycled and other solids is passed from feeder 1 to granulator 2 to form a nuclei bed in said granulator. A slurry 3 containing fertilizer raw materials, to be coated on the nuclei, is mixed in mixing and holding tank 4 by stirrer 5, the slurry being heated to the desired temperature by heater 6. The slurry, however, may be the product of a direct manufacturing procedure for the material to be pelletized.

The slurry is then pumped by means of pump 7 through line 8, where it is sprayed over the nuclei bed through nozzles 9 and 10. The moisture content of the nuclei bed is controlled by passing hot gas or a mixture of hot gases through granulator 2 either countercurrent to or concurrent with the flow of the other materials therethrough. In the specific embodiment, the hot gas enters at inlet end 2ª and exits at the opposite conical end 2ᵇ of the granulator, the wetted nuclei bed being showered through the hot drying gas. Suction is provided at the gas exit end of the granulator by means of blower 11 to aid in the withdrawal of the exit gas from the granulator. Preferably, blower 11 is connected to a cyclone separator 12 for the removal of fine particles present in the exit gases passing from the granulator to the blower 11 through line 13. A damper valve 14 is provided for controlling the flow of exit gas.

The nuclei coated material formed in granulator is collected in the product receptacle 15 through discharge hopper 16. The sizes that are too coarse are ground, and with the too small sizes are transferred to recycle receptacle 17, and in turn passed to hopper or feeder 1.

If desired, a dryer 18 is provided to condition the formed granules fed thereto through feeder 19. The dryer may be of the small-scale rotary type, belt driven by means of motor 20 and belt 21. The dryer is rotatably supported on rollers 22 by means of bands 23 supported on said dryer and in contact with said rollers. Hot gases similar to those blown through the granulator are coursed through the dryer.

Granulator 2 as shown is of the conventional rotary design, being belt-driven by means of motor 24 and belt 25. The granulator is rotatably supported on rollers 26 by means of bands 27 supported on said granulator and in contact with said rollers.

Figure 2:
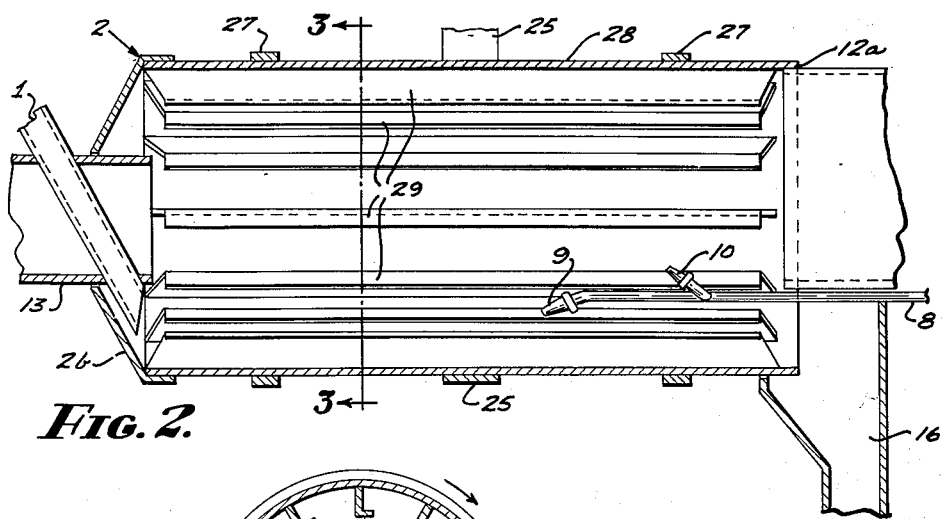
FIG. 2 is a longitudinal sectional view of the granulator shown in FIG. 1.
Figure 3:
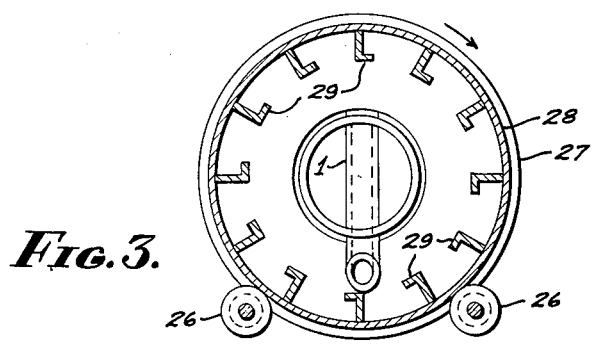
FIG. 3 is a transverse sectional view taken on the line 3—3 of FIG. 2.

As shown in FIG. 2, the granulator 2 comprises a cylindrical shell 28 mounted with its axis about horizontal. Preferably, there is provided a slight downward slope, such as ⅛ inch per foot of length toward the gas inlet end 2ª to expedite the exit of solid granules to the discharge hopper 16. The granulator is provided with a plurality of vanes 29 of sufficient capacity to lift the nuclei bed material, as, for example, an average of twice per revolution. Perferably, the exit end 2ᵇ of the granulator is conical to effect a better seal to the exhaust system. The vanes 29 are cut off at a short distance from the ends of the granulator in order to prevent end effects determining the discharge rate of the granulator.

In operation, slurry is continuously delivered into the granulator through nozzles 9 and 10 at a short distance within the flight area. For the sake of an exemplary showing one of these nozzles has been shown directed downwardly onto the bed. The granulator rotates at a suitable speed, such as 16 r.p.m. to shower the solid nuclei bed through the spray of slurry and the hot gases containing the products of combustion of fuel oil and air continuously blown through the granulator for distilling off the solvent of the slurry, leaving the desired nuclei coated fertilizer pellets.

I have found it advisable at predetermined intervals, such as every fifteen minutes, to make a sieve analysis of the granulator effluent. The amount of recycle is calculated from this and the weight of through-put obtained. This calculated weight of recycled material is ground and continuously returned to the granulator from recycle receptacle 17 to hopper 1. This method of introducing recycle material, as called for by the sieve analysis, is called the natural recycle rate.

I have prepared a number of fertilizer pellets in accordance with the foregoing process, as illustrated by the following examples:

EXAMPLE 8

This example illustrates the preparation of fertilizer pellets from the fertilizer composition of Example 1 of 14-0-14 grade.

A bed of nuclei (from recycle material and from dried spray) of 14-0-14 grade and having a sieve analysis +10 mesh, 9%, −10 to +30 mesh, 89.7%, −30 mesh, 1.3% was sprayed with a slurry at a temperature of 95° F., comprising 79% of 14-0-14 fertilizer and 21% water (all suspended matter was under 12 mesh and no wetting or dispersing agents were added) under the following operating conditions:

Bed moisture _____percent___ 0.75
Bed temperature _____° F___ 182
Inlet gas temp _____° F___ 360
Outlet gas temp _____° F___ 204

At the end of a 3¾ hours' running time, the following results were obtained:

Production rate (granulator effluent-recycled material):
  32 lbs./hr. of dried sized product of −4 mesh to −16 mesh. Hold-up weight: 72 lbs.

Granulator effluent:
  Rate: 40.8 lbs. per hour.
  Composition analysis:
    99.6% 14-0-14.
    .4% moisture.
  Sieve analysis:
    +4 mesh, 15.8%.
    −4 mesh +5 mesh, 12.6%.
    −5 mesh +10 mesh, 70.3%.
    −10 mesh, 1.3%.

Recycled material:
  Rate: approximately equal to a +4 mesh and −10 mesh material produced; 8.8 lbs./hr.
  Composition analysis:
    99.6% 14-0-14.
    .4% moisture.
  Sieve analysis: all material ground to 100% minus 10 mesh.

Operating data and resulting data from three additional runs are shown below in Examples 9-11.

EXAMPLE 9

Material granulated: 14-0-14 of Example 1.
Production rate: 41½ lbs./hr. of dried sized (−4 mesh, −16 mesh) product.
Running time: 6¼ hours.

Hold-up weight: 68 lbs.
Slurry food: Sprayed through an air atomizing nozzle and directed on the third fifth and fourth fifth of the granulating bed.
Slurry:
  Composition analysis:
    14-0-14, 81%.
    Water, 19%.
  All suspended matter minus 12 mesh.
  Temperature, 85° F.
Granulator effluent:
  Rate: 41½ lbs./hr.
  Composition analysis: same as run 31.
  Sieve analysis:
    +4 mesh, 0.7%.
    −4 mesh +5 mesh, 1.6%.
    −5 mesh +10 mesh, 89.8%.
    −10 mesh +16 mesh, 7.7%.
    −16 mesh, 0.2%.
Recycled material: None.
Nuclei material: Dried spray of same composition as the product or granulator effluent.
Operating conditions:
  Bed moisture, 0.40%.
  Bed temperature, 220° F.
  Inlet gas temperature, 420° F.
  Outlet gas temperature, 220° F.
  Gas flow rate, 460 lbs./hr.

EXAMPLE 10

Material granulated: 15-15-15 of Example 3.
Production rate: 22 lbs./hr. of dried sized product (−4 mesh −16 mesh).
Running time: 4½ hours.
Hold-up weight: 46 lbs.
Slurry food: Sprayed through an air atomizing nozzle directed onto the second third of the granulator bed.
Slurry:
  Composition analysis:
    15-15-15, 60%.
    Water, 40%.
  All suspended matter less than 12 mesh.
  Slurry temperature, 115° F.
Granulator effluent:
  Rate: 26.4 lbs./hr.
  Composition:
    15-15-15, 97.3%.
    Moisture, 2.7%.
  Sieve analysis:
    +4 mesh, 4.0%.
    −4 mesh +5 mesh, 3.8%.
    −5 mesh +10 mesh, 88.7%.
    −10 mesh, 3.3%.
Recycled material:
  Rate: 4.4 lbs./hr. (all material less than 10 mesh or greater than 8 mesh).
  Composition: Same as granulator effluent.
Product:
  Composition: Same as granulator effluent.
  Sieve analysis: 100% minus 8 mesh and plus 10 mesh.
Nuclei material: Composition same as product supplied by dried spray and recycled material.
Operating conditions:
  Bed moisture, not taken
  Bed temperature, 231 °F.
  Inlet gas temperature, 340° F.
  Outlet gas temperature, 240° F.
  Gas flow rate, 535 lbs./hr.

EXAMPLE 11

Material granulated: 20-0-20 of Example 4.
Production rate: 40 lbs./hr. of dried sized product (−4 mesh +10 mesh).
Running time: 6¼ hours.
Hold-up weight: 65 lbs.
Slurry food: Sprayed through an air atomizing nozzle onto the second third of the granulator bed material.
Slurry:
  Composition analysis:
    20-0-20, 83%.
    Water, 17%.
  All suspended matter was minus 12 mesh.
  Slurry temperature 85-90° F.
Granulator effluent:
  Rate: 56 lbs./hr.
  Composition:
    20-0-20, 99.7%.
    Water, .3%.
  Sieve analysis:
    +4 mesh, 5.9%.
    −4 mesh +5 mesh, 13.2%.
    −5 mesh +10 mesh, 76.8%.
    −10 mesh, 4.1%.
Recycled material: 16 lbs./hr. (all material +5 mesh or −10 mesh).
Product:
  Composition same as granulator effluent.
  Sieve analysis: 100% −5 mesh +10 mesh.
Nuclei material:
  Composition: same as granulator effluent.
  Sieve sizes: 100% −10 mesh +30 mesh.
Operating conditions:
  Bed moisture, approx. 0.2%.
  Bed temperature, 195° F.
  Inlet gas temperature, 390° F.
  Outlet gas temperature, 193° F.
  Gas flow, 405 lbs./hr.

The invention in its broader aspects is not limited to the specific steps and processes described but departures may be made therefrom within the scope of the accompanying claims without departing from the principles of the invention and without sacrificing its chief advantages.

I claim:

1. A continuous process for the formation of rounded pellets of substantially uniform size comprising providing a bed of nuclei of substance to be pelletized, in which bed said nuclei are in contact with each other, said nuclei having a particle size of at least about 40 mesh, said bed being located in a rotating chamber having vanes acting to elevate portions of said bed from the bottom of said chamber to a higher point therein and release said elevated portions so that they fall freely back to the bottom of said chamber, wetting localized portions only of said bed in the lower portion of said rotating chamber by direct application thereto of a water slurry of substance to be pelletized and immediately elevating and releasing said bed portions before an agglomerating action occurs to any substantial extent between the nuclei in the wetted parts thereof, while passing hot drying gases through said chamber, the said locally wetted portions of said bed separating into single coated nuclei and small groups of nuclei, of lesser size than the desired pellets, by reason of the agitation involved in the aforesaid elevation and release of the said portions of the bed, and the showering of the released portions of the bed downwardly through the said hot drying gases whereby the coated nuclei and groups of nuclei are dried to a non-agglomerating moisture content during their descent through said hot drying gases, and prior to the time they rejoin the bed at the bottom of said chamber, and whereby uncoated nuclei have their moisture content reduced so as to maintain the general moisture content of said bed at a value below the agglomerating point.

2. The process claimed in claim 1 wherein said slurry is applied to said bed so as to wet surface portions thereof only.

3. The process claimed in claim 2 wherein the nuclei and groups of nuclei are coated and recoated with solids from said slurry to the extent of forming pellets of at least about 0.03 inch to 1.5 inches, said pellets consisting preponderantly of solids derived from said slurry.

4. The process claimed in claim 3 including the step of spraying additional slurry into said hot drying gases in the form of minute droplets whereby to coat said coated nuclei and coated groups of nuclei, while in a free falling separated condition in said hot drying gases, the action of the hot drying gases being such as to dry substantially instantaneously the said fine droplets of additional slurry imposed thereon before said nuclei and groups of nuclei rejoin the bed at the bottom of said chamber.

5. The process claimed in claim 4 including the step of spraying additional slurry into said hot drying gases in said chamber so as to form spray dried particles thereof acting as additional nuclei.

References Cited in the file of this patent
UNITED STATES PATENTS
2,926,079    Smith ------------------ Feb. 23, 1960